US010925104B2

(12) United States Patent
Liang et al.

(10) Patent No.: US 10,925,104 B2
(45) Date of Patent: Feb. 16, 2021

(54) METHOD AND DEVICE FOR NETWORK CONNECTION DOWNLOAD

(71) Applicant: Alibaba Group Holding Limited, Grand Cayman (KY)

(72) Inventors: Jie Liang, Guangzhou (CN); Zhibin Deng, Guangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 753 days.

(21) Appl. No.: 15/583,878

(22) Filed: May 1, 2017

(65) Prior Publication Data

US 2017/0238358 A1 Aug. 17, 2017

Related U.S. Application Data

(63) Continuation of application No. PCT/CN2015/088717, filed on Sep. 1, 2015.

(30) Foreign Application Priority Data

Oct. 31, 2014 (CN) .......................... 2014 1 0609994

(51) Int. Cl.
H04W 76/15 (2018.01)
H04W 76/10 (2018.01)
H04L 29/08 (2006.01)

(52) U.S. Cl.
CPC ............. *H04W 76/15* (2018.02); *H04L 67/04* (2013.01); *H04L 67/06* (2013.01); *H04W 76/10* (2018.02)

(58) Field of Classification Search
CPC ........ H04L 67/04; H04L 67/06; H04W 76/10; H04W 76/15
See application file for complete search history.

(56) References Cited

U.S. PATENT DOCUMENTS

| 8,510,401 | B2* | 8/2013 | Bai ........................ H04L 67/06 |
| | | | 709/206 |
| 10,015,119 | B2* | 7/2018 | Yao ........................ H04L 67/06 |
| 2004/0054650 | A1* | 3/2004 | Chun ................. H04M 1/72522 |

(Continued)

FOREIGN PATENT DOCUMENTS

| CN | 102083059 A | 6/2011 |
| CN | 103238299 A | 8/2013 |

(Continued)

OTHER PUBLICATIONS

The World Intellectual Property Organization (WIPO) International Search Report for PCT/CN2015/088717 dated Dec. 2, 2015 pp. 1-6.

*Primary Examiner* — Chris Parry
*Assistant Examiner* — Adam A Cooney
(74) *Attorney, Agent, or Firm* — Alston & Bird LLP

(57) ABSTRACT

Method and device for network connection download are provided. The method includes: creating, by a terminal device, at least one backup pre-allocated connection; and before a pre-allocated connection is used, performing a corresponding network initialization operation to allow the terminal device, while downloading a file, to select the pre-allocated connection needed for downloading the file directly from the at least one backup pre-allocated connection, thereby obviating the need to re-perform the corresponding network initialization operation.

18 Claims, 11 Drawing Sheets

(56) References Cited

U.S. PATENT DOCUMENTS

| | | | |
|---|---|---|---|
| 2004/0141502 A1* | 7/2004 | Corson | H04W 36/18 370/389 |
| 2004/0215776 A1* | 10/2004 | Tam | G06Q 30/02 709/226 |
| 2008/0288611 A1* | 11/2008 | Toyomura | H04L 47/2416 709/219 |
| 2012/0215839 A1* | 8/2012 | Doyle | G06F 16/957 709/203 |
| 2013/0103779 A1* | 4/2013 | Bai | H04L 67/2833 709/213 |
| 2013/0346552 A1* | 12/2013 | Yu | G06F 16/9574 709/217 |
| 2014/0298395 A1* | 10/2014 | Yang | H04N 21/4363 725/115 |

FOREIGN PATENT DOCUMENTS

| | | | |
|---|---|---|---|
| CN | 103873592 A | 6/2014 | |
| CN | 104023409 A | 9/2014 | |
| WO | 2010142852 A1 | 12/2010 | |

* cited by examiner

METHOD AND DEVICE FOR NETWORK CONNECTION DOWNLOAD

CROSS-REFERENCES TO RELATED APPLICATIONS

This application is a continuation of PCT application No. PCT/CN2015/088717, filed on Sep. 1, 2015, which claims priority of Chinese Patent Application No. 201410609994.7, filed on Oct. 31, 2014, the entire contents of which are hereby incorporated by reference.

FIELD OF THE DISCLOSURE

The present disclosure relates to the field of network transmission technology and, more particularly, relates to method and device for network connection download.

BACKGROUND

Currently there are only two download methods. One method is non-breakpoint continuing transmission and the other method is breakpoint continuing transmission. In the two methods, the breakpoint continuing transmission can be separated into two parts: one part is breakpoint and the other part is continuing transmission. The breakpoint means that, while downloading, a download file can be divided into multiple parts that can be downloaded at the same time. When a task is suspended at some point in time, the position where the task is suspended from downloading is the breakpoint. The continuing transmission means that, when an unfinished downloading task restarts, the file will continue to be sent for download from the last breakpoint. The method of the breakpoint continuing transmission not only allows repeated download to be effectively avoided, but also allows broadband to be more fully utilized for improving download speed efficiently. Now most of servers can support the breakpoint continuing transmission.

In general, breakpoint continuing transmission download breaks the file down into multiple size-fixed blocks. In mobile platform, the principle of the conventional method for breakpoint continuing transmission download is: creating first three blocks for three connection request files; when downloading of one of the blocks is completed, creating a connection for the fourth block; and going on until downloading of all of the blocks is completed, that is, the entire downloading task is completed. Creating the request for the connection of the n-th block includes: (1) assembling, by the client terminal program, data and preparing message data of a HTTP request needed for transmission; (2) performing DNS query and creating a socket connection according to a returned IP address, also known as an initializing network; (3) sending data of the HTTP request that include request header data and request body data; and (4) receiving data of downloading files. Because a downloading operation generally uses a HTTP Get way for request, which is characterized by only a negligible small number of request header data in the sent request, the time consumed in steps (1) and (3) can be ignored.

As described above, by recording the time consumed in each connection of the downloading task, a flow chart can be obtained as illustrated in FIG. 1. As shown in FIG. 1, the next connection will start immediately after receiving a connection is completed, and each connection will be implemented according to the above steps. For each connection, the shaded portion of the graph is the time consumed for initializing network, and the white portion is the time consumed for receiving the data.

However, when network state of the mobile platform is not stable, sometimes it is time consuming to perform DNS query and create socket connection due to the limitation of mobile gateway, i.e., the consumed time represented by the shaded portion in FIG. 1. If the time consumed in initializing network for each connection is very long, transmission efficiency will be definitely reduced, thus, affecting downloading experience.

BRIEF SUMMARY OF THE DISCLOSURE

The technical problem that the present disclosure mainly solves is to provide method and device for network connection download, which can shorten connection time and increase transmission rate.

In order to solve the above technical problems, a technical solution of the present disclosure provides a method for network connection download. The method includes: creating, by a terminal device, at least one backup pre-allocated connection; and before a pre-allocated connection is used, performing a corresponding network initialization operation to allow the terminal device, while downloading a file, to select the pre-allocated connection needed for downloading the file directly from the at least one backup pre-allocated connection.

Optionally, creating, by the terminal device, the at least one backup pre-allocated connection includes: according to a quantity of concurrent connection of a file downloading task, creating the at least one pre-allocated connection, where M=N+1, M denotes a quantity of the pre-allocated connection, N denotes the quantity of the concurrent connection, and both M and N are natural number.

Optionally, selecting, by the terminal device, the needed pre-allocated connection directly from the at least one pre-allocated connection includes: selecting, by the terminal device, directly from the at least one pre-allocated connection, the pre-allocated connection having a quantity corresponding to the quantity of the concurrent connection of the file downloading task, to send a download request to a server through each of the selected pre-allocated connection and acquire corresponding data to complete downloading a file block. The file supports breakpoint continuing transmission download at the server terminal.

Optionally, after the step of selecting, by the terminal device, from the at least one pre-allocated connection, the pre-allocated connection having the quantity corresponding to the quantity of the concurrent connection of the file downloading task, the method further includes: when a quantity of currently-used pre-allocated connections equals to the quantity of the concurrent connection and downloading of the file is uncompleted, creating, by the device terminal, backup pre-allocated connections having a same quantity according to the quantity of currently-used pre-allocated connections, and re-performing the corresponding network initialization operation before the pre-allocated connection is used.

Optionally, after the step for the terminal device to select the pre-allocated connection needed for downloading the file directly from the at least one backup pre-allocated connection, the method further includes: assembling, by the terminal device, at least a portion of the downloaded file block to obtain at least a partial content of the file; and recycling, by the terminal device, an unused pre-allocated connection from the created at least one pre-allocated connection.

Another technical solution applied by the present disclosure provides a device for network connection download. The device includes: a pre-allocated connection creating unit, configured to create at least one backup pre-allocated connection; and a controller, configured to perform a network initialization operation to the at least one pre-allocated connection created by the pre-allocated connection creating unit, to allow the device, while downloading a file, to select the needed pre-allocated connection directly from the at least one pre-allocated connection.

Optionally, the pre-allocated connection creating unit is configured to create the at least one pre-allocated connection according to a quantity of concurrent connection of a file downloading task, where M=N+1, M denotes a quantity of the pre-allocated connection, N denotes the quantity of the concurrent connection, and both M and N are natural number.

Optionally, the device further includes: a file downloading unit, configured to select the pre-allocated connection having a quantity corresponding to the quantity of the concurrent connection of the file downloading task, from the at least one pre-allocated connection created by the pre-allocated connection creating unit, to send a download request to a server through each of the selected pre-allocated connection and acquire corresponding data to complete downloading a file block. The file supports breakpoint continuing transmission download at the server terminal.

Optionally, the device further includes: a file combining unit, configured to assemble at least a portion of the file block downloaded by the file downloading unit to obtain at least a partial content of the file; and a pre-allocated connection recycling unit, configured to recycle an unused pre-allocated connection from the at least one pre-allocated connection created by the pre-allocated connection creating unit.

Optionally, when a quantity of currently-used pre-allocated connections equals to the quantity of the concurrent connection and downloading of the file is uncompleted, the pre-allocated connection creating unit is also configured to create backup pre-allocated connections having a same quantity according to the quantity of the pre-allocated connections used by the file downloading unit, and before the created pre-allocated connection is used, the controller performs the corresponding network initialization operation controller.

Another aspect of present disclosure provides a terminal device. The terminal device includes a memory and at least one processor coupled to the memory. The memory stores computer-executable instructions for controlling the at least one processor to: create at least one backup pre-allocated connection, and before a pre-allocated connection is used, perform a corresponding network initialization operation to allow the terminal device, while downloading a file, to select the pre-allocated connection needed for downloading the file directly from the at least one backup pre-allocated connection.

Optionally, the at least one processor is configured to: according to a quantity of concurrent connection of a file downloading task, create the at least one pre-allocated connection, where M=N+1, M denotes a quantity of the pre-allocated connection, N denotes the quantity of the concurrent connection, and both M and N are natural number.

Optionally, the at least one processor is configured to: select directly from the at least one pre-allocated connection, the pre-allocated connection having a quantity corresponding to the quantity of the concurrent connection of the file downloading task, send a download request to a server through each of the selected pre-allocated connection and acquire corresponding data to complete downloading a file block. The file supports breakpoint continuing transmission download at the server terminal.

Optionally, the at least one processor is configured to: when a quantity of currently-used pre-allocated connections equals to the quantity of the concurrent connection and downloading of the file is uncompleted, create backup pre-allocated connections having a same quantity according to the quantity of currently-used pre-allocated connections, and re-perform the corresponding network initialization operation before the pre-allocated connection is used.

Optionally, the at least one processor is configured to: assemble at least a portion of the downloaded file block to obtain at least a partial content of the file; and recycle an unused pre-allocated connection from the created at least one pre-allocated connection.

Optionally, the memory includes a non-transitory computer-readable storage medium having the computer-executable instructions stored thereon.

The present disclosure provides method and device for network connection download, which are able to create the pre-allocated connection according to connection allocation policy, and complete the network initialization operation of the pre-allocated connection in advance. When use is actually needed, a connection can be fetched directly from the pre-allocated connection to send file download request to a server, and corresponding data can be acquired from the server, thus, reducing the time consumed in connection transmission, and increasing transmission efficiency.

DETAILED DESCRIPTION

The detailed description of the technical content, the structural characteristics, purpose and the effect achievement of the present disclosure will be more readily apparent from the following detail description with the accompanying drawings and the contents of the claims.

The present disclosure provides method and device for network connection download. The method includes: creating, by a terminal device, at least one backup pre-allocated connection; and before a pre-allocated connection is used, performing a corresponding network initialization operation to allow the terminal device, while downloading a file, to select the pre-allocated connection needed for downloading the file directly from the at least one backup pre-allocated connection, thereby obviating the need to re-perform the corresponding network initialization operation.

The present disclosure allows creation of the pre-allocated connection according to a connection allocation policy. The network initialization operation can be completed in advance for the pre-allocated connection. When use is actually needed, a connection can be fetched directly from the pre-allocated connection to send file download request to a server, and corresponding data can be acquired from the server, thus, reducing the time consumed in connection transmission, and increasing transmission efficiency.

The following concepts related to the present disclosure will first be explained.

Quantity of concurrent connection: the maximum number of connections that a downloading task can initiate at the same time. For example, when the allowable quantity of the concurrent connection of a downloading task is three, then the downloading task while downloading only allows three connections to send and receive data at the same time.

Connection pool, configured to manage and store unused connections.

Figure 1:
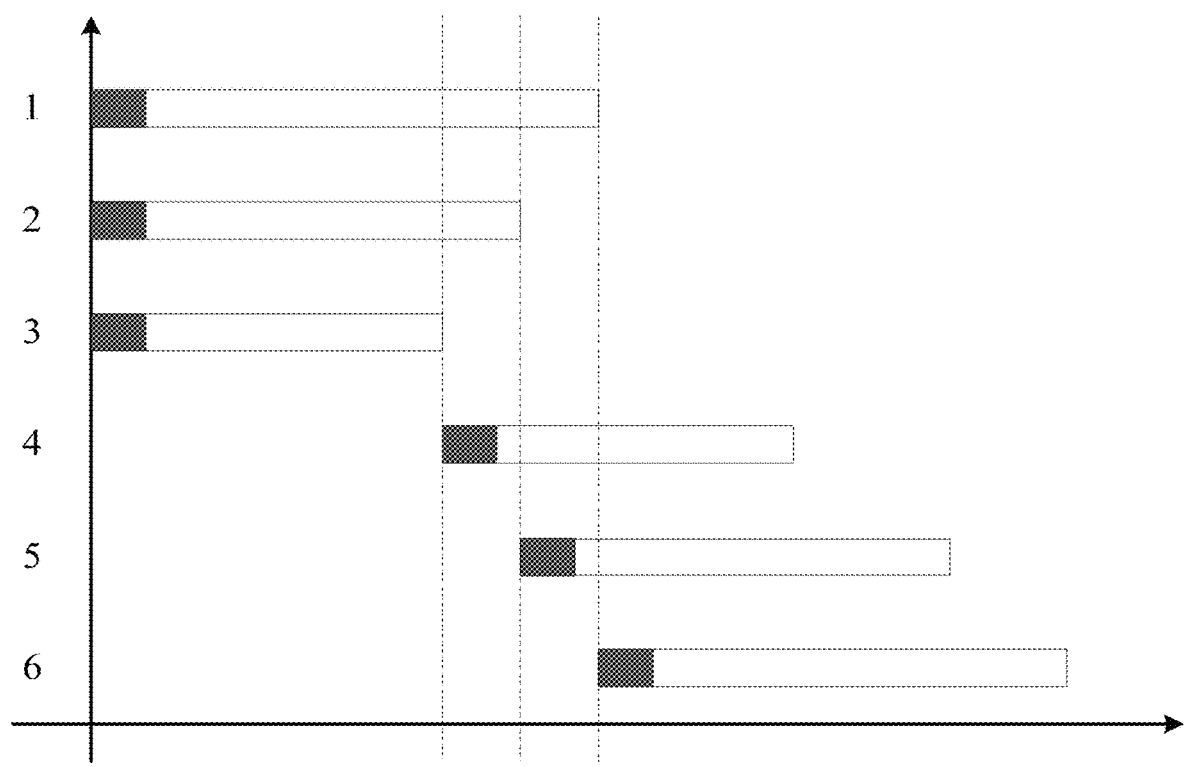
FIG. 1 illustrates a flow chart of an existing method to create and use connections in the prior art.
Figure 2:
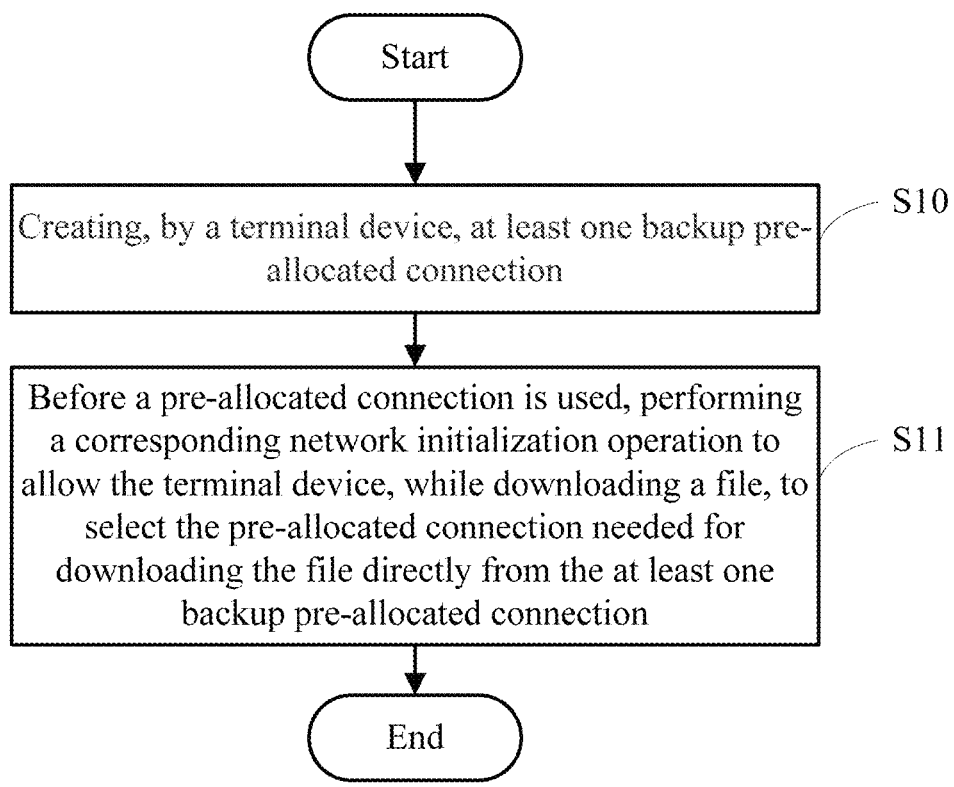
FIG. 2 illustrates a flow chart of an exemplary method for network connection download according to the present disclosure.

Referring to FIG. 2, FIG. 2 illustrates a flow chart of an exemplary method for network connection download according to the present disclosure. As shown in FIG. 2, the method for network connection download may include the following steps:

In Step S10, creating, by a terminal device, at least one backup pre-allocated connection;

In Step S11, before a pre-allocated connection is used, performing a corresponding network initialization operation to allow the terminal device, while downloading a file, to select the pre-allocated connection needed for downloading the file directly from the at least one backup pre-allocated connection.

In particular, the pre-allocated connection may be the connection created in advance, and each connection may correspond to a downloading task when being selected for use. The network initialization operation may be configured to perform DNS query and create socket connection according to the returned IP address.

With the embodiment of the present disclosure, the pre-allocated connection may be created according to connection allocation policy, and the network initialization operation for the pre-allocated connection may be completed in advance. When use is actually needed, a connection may be fetched directly from the pre-allocated connection to send a file downloading request to a server and acquire corresponding data from the server, without the need to spend time and resources re-performing the network initialization operation, thereby shortening the time consumed in connection transmission and improving transmission efficiency.

Figure 3:
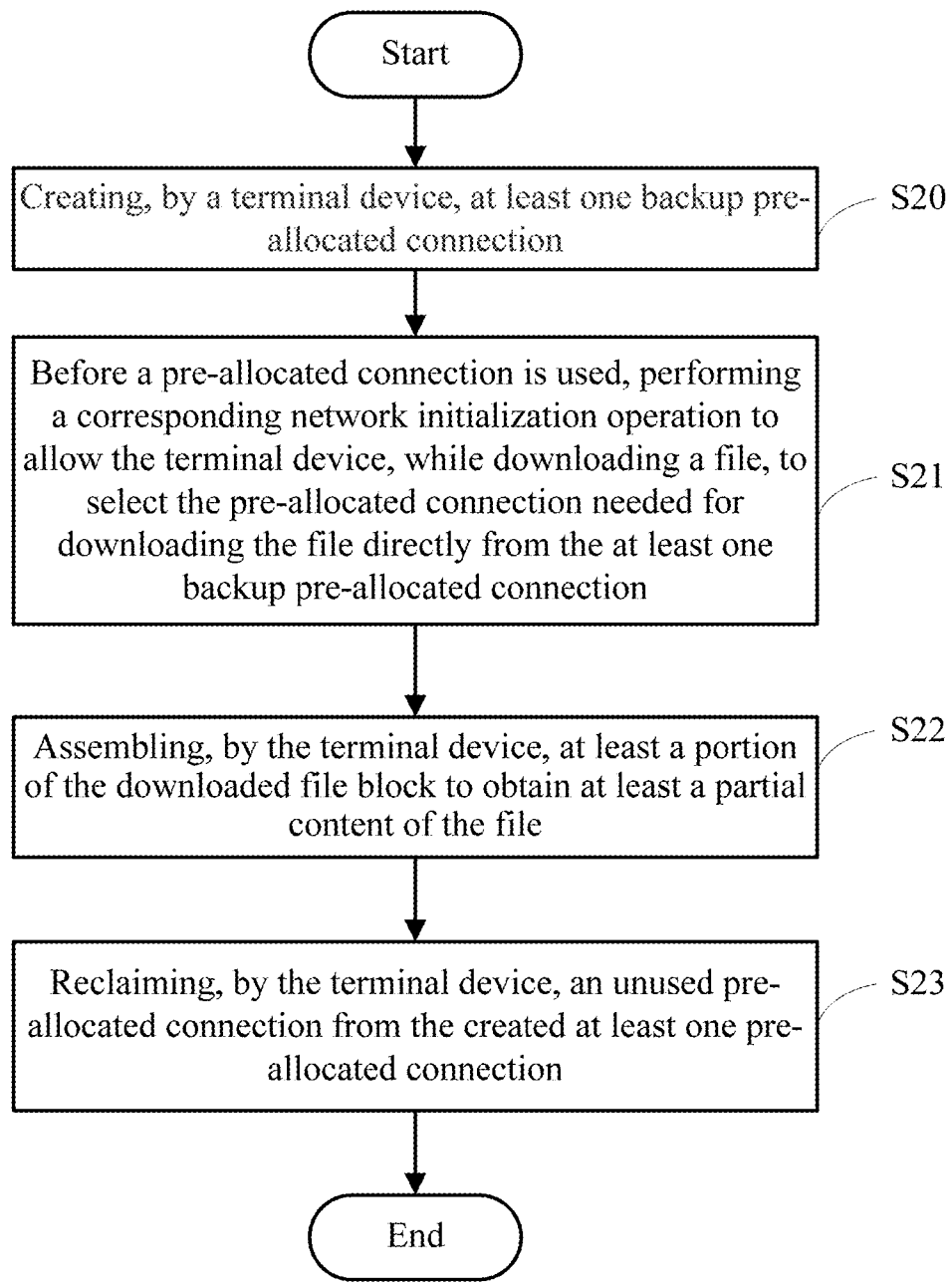
FIG. 3 illustrates a flow chart of another exemplary method for network connection download according to the present disclosure.

Referring to FIG. 3, FIG. 3 illustrates a flow chart of another exemplary method for network connection download according to the present disclosure. As shown in FIG. 3, the method for network connection download may include the following steps:

In Step S20, creating, by the terminal device, the at least one backup pre-allocated connection.

In particular, the terminal device may create at least one pre-allocated connection according to a quantity of concurrent connection of a file downloading task, where M=N+1, M denotes a quantity of the pre-allocated connection, N denotes the quantity of the concurrent connection, and both M and N are natural number.

In Step S21, before the pre-allocated connection is used, performing the corresponding network initialization operation to allow the terminal device, while downloading a file, to select the pre-allocated connection needed for downloading the file directly from at least one pre-allocated connection, without the need to re-perform the corresponding network initialization operation.

The network initialization operation may include performing DNS query for connection and connecting socket.

In particular, the terminal device may select the pre-allocated connection having a quantity corresponding to the quantity of the concurrent connection of the file downloading task, from at least one pre-allocated connection, to send the downloading request to the server through each of the selected pre-allocated connection and acquiring the corresponding data from the server to complete downloading a file block. The file supports breakpoint continuing transmission download at the server terminal.

In Step S22, assembling, by the terminal device, at least a portion of the downloaded file block to obtain at least a partial content of the file.

In Step S23, recycling an unused, pre-allocated connection from the created at least one pre-allocated connection.

With the embodiment of the present disclosure, the pre-allocated connection may be created according to connection allocation policy, and the network initialization operation for the pre-allocated connection may be completed in advance. When use is actually needed, a connection may be fetched directly from the pre-allocated connection to send file downloading request to a server and acquire corresponding data from the server, without the need to spend time and resources re-performing the network initialization operation, thereby shortening the time consumed in connection transmission and improving transmission efficiency. Meanwhile, according to the formula: M=N+1, a remaining pre-allocated connection may be directly selected for download, while the pre-allocated connection transmission is completed and the network initialization operation is performed to the newly created pre-allocated connection, thereby obviating waiting, and thus increasing the transmission efficiency.

Figure 4:
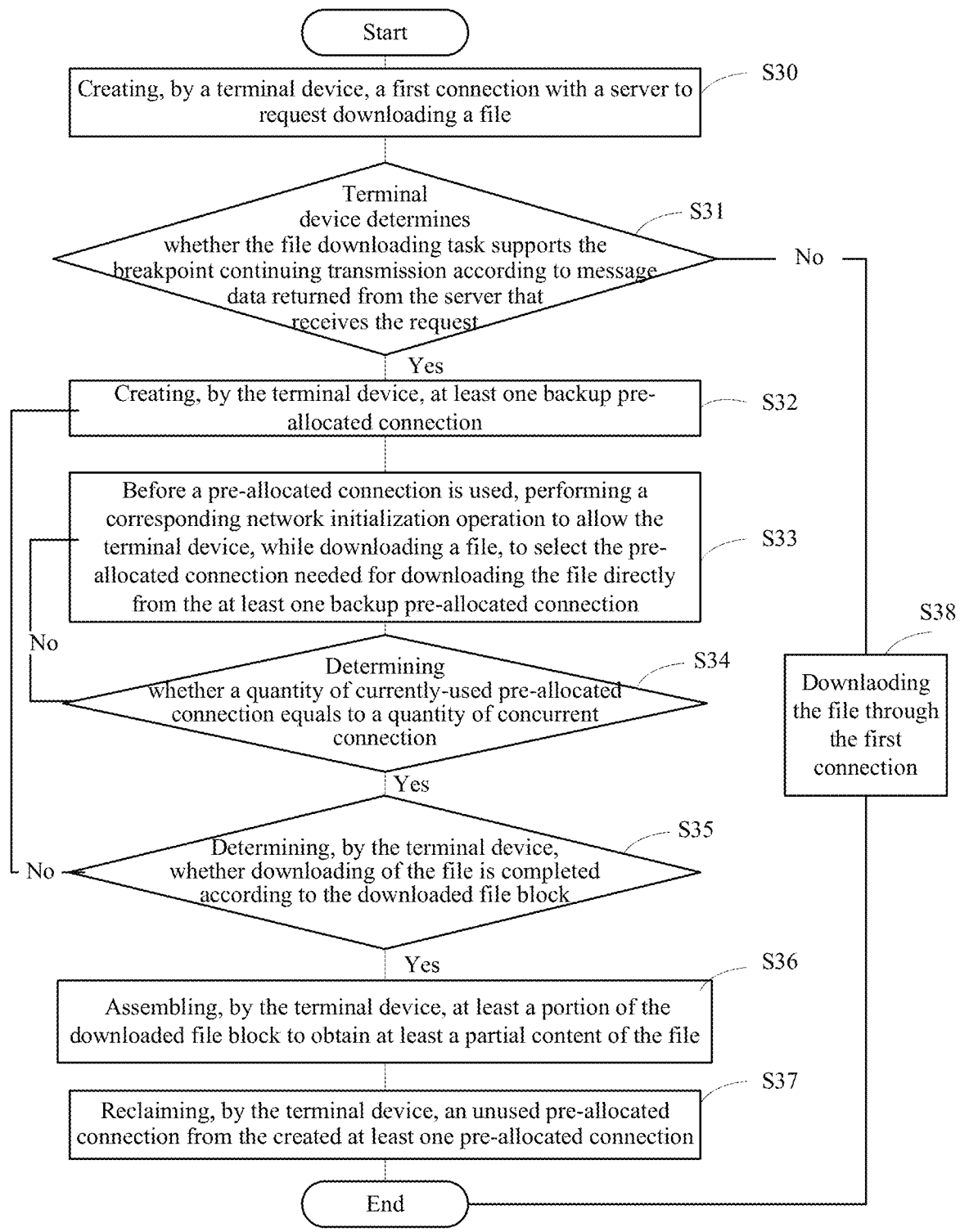
FIG. 4 illustrates a flow chart of another exemplary method for network connection download according to the present disclosure.

Referring to FIG. 4, FIG. 4 illustrates a flow chart of another exemplary method for network connection download according to the present disclosure. As shown in FIG. 4, the method for network connection download may include the following steps:

In Step S30, creating, by the terminal device, a first connection with the server to request downloading a file.

In Step S31, determining, by the terminal device, whether the file downloading task supports the breakpoint continuing transmission according to message data returned from the server that receives the request. If "Yes", then Step S32 may be implemented. Otherwise, Step S39 may be implemented.

In Step S32, creating, by the terminal device, the at least one backup pre-allocated connection.

In particular, the terminal device may create at least one pre-allocated connection according to the quantity of the concurrent connection of the file downloading task, where M=N+1, M denotes the quantity of the pre-allocated connection, N denotes the quantity of the concurrent connection, and both M and N are natural number.

In Step S33, before the pre-allocated connection is used, performing the corresponding network initialization operation to allow the terminal device, while downloading the file, to select the pre-allocated connection needed for downloading the file directly from at least one pre-allocated connection.

In particular, the terminal device may select the pre-allocated connection having a quantity corresponding to the quantity of the concurrent connection of the file downloading task, directly from the at least one pre-allocated connection, to send the downloading request to the server through each of the selected pre-allocated connection and acquire the corresponding data from the server to complete downloading a file block. The file supports breakpoint continuing transmission download at the server terminal.

In Step S34, determining whether the quantity of currently-used pre-allocated connections equals to the quantity of the concurrent connection. If "Yes", Step S35 may be implemented. Otherwise, Step S33 may be implemented.

In Step S35, determining, by the terminal device, whether downloading of the file is completed according to the downloaded file block.

In Step S36, assembling, by the terminal device, at least a portion of the downloaded file block to obtain at least a partial content of the file.

In Step S37, recycling the unused, pre-allocated connection from the created at least one pre-allocated connection. Then, the flow ends.

In Step S38, creating, by the terminal device, backup pre-allocated connections having the same quantity according to the quantity of currently-used pre-allocated connections, and performing the corresponding network initialization operation before the pre-allocated connection is used. Then, Step S33 may be implemented.

In Step S39, downloading, by the terminal device, the file through the first connection from the server. Then, the flow ends.

That "the terminal device creates backup pre-allocated connections having the same quantity according to the quantity of currently-used pre-allocated connections", may determine the time for the newly created pre-allocated connection according to the progress of the file block downloaded by the currently-used pre-allocated connection. For example, when the progress of the file block downloaded by the currently-used pre-allocated connection exceeds a predetermined percentage (e.g., about 50%), the same quantity of the backup pre-allocated connection may be re-created.

Meanwhile, that "performing the corresponding network initialization operation before the pre-allocated connection is used" may pre-evaluate the network circumstances or the use of resources, and then perform the network initialization operation according to the circumstances. For example, when the current network circumstances are unobstructed, the network initialization operation may be performed to the newly created pre-allocated connection, while downloading the file block for the selected pre-allocated connection. Under the circumstances that the current network speed is low or the resource usage is large, the selected pre-allocated connection may be preferred to download the file block, whereas the network initialization operation may not be performed temporarily to the newly created pre-allocated connection, or the network initialization operation may be performed only to one or several of the newly created pre-allocated connection, or the network initialization operation may be performed in sequence to the newly created pre-allocated connection.

Referring to FIGS. 5 to 9, FIGS. 5 to 9 illustrate five flow charts of an exemplary method for network connection download to create and use connections according to the present disclosure. The present embodiment may take a downloading task that needs seven connections to be completed for example, that is, the file needed for download may be divided into seven file blocks to be downloaded separately. It is assumed that the quantity of the concurrent connection of the downloading task is three, and the breakpoint continuing transmission is supported. The entire workflow will be described as follows.

Figure 5:
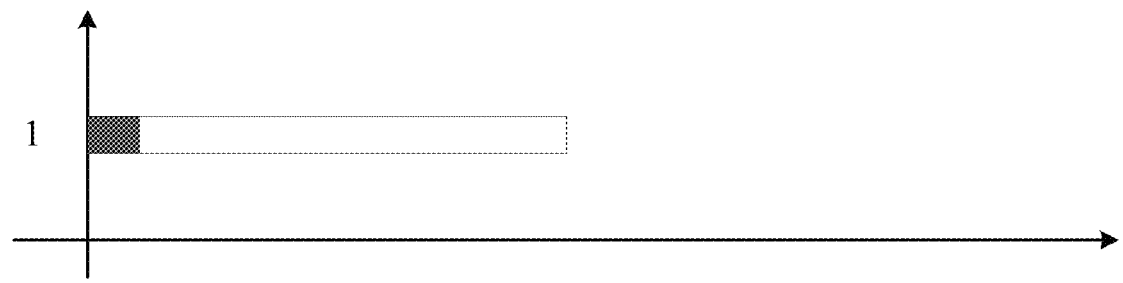
FIGS. 5 to 9 illustrate five flow charts of an exemplary method for network connection download to create and use connections according to the present disclosure.

As shown in FIG. 5, the terminal device creates the first connection with the server to request for downloading the file. The shaded portion represents the time consumed for the network initialization, while the white portion represents the time consumed for receiving the data.

Figure 6:
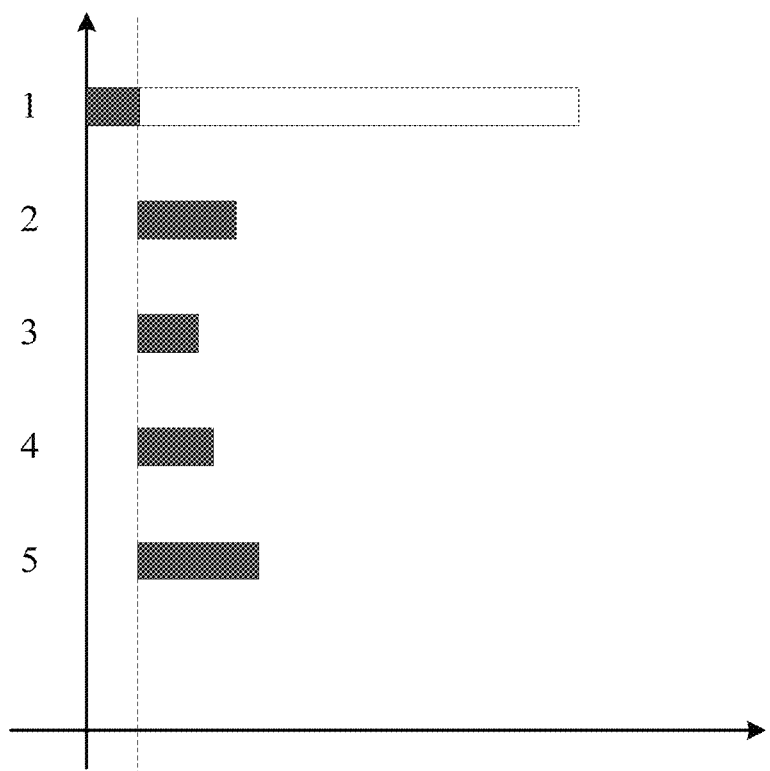

As shown in FIG. 6, according to the method of the present disclosure for network connection download, after connection 1 returns the message data supporting the breakpoint continuing transmission, based on the formula: the quantity of the pre-allocated connection the quantity of the concurrent connection+1, the quantity of the pre-allocated connection needed to be created may equal to 4. For convenient description, herein it is assumed that new connection is not initiated until connection 1 completes downloading file block 1. At this point, the corresponding network initialization operation may be performed to the created pre-allocated connections 2, 3, 4, and 5. The shaded portions represent the time consumed for the network initialization in each pre-allocated connection.

Figure 7:
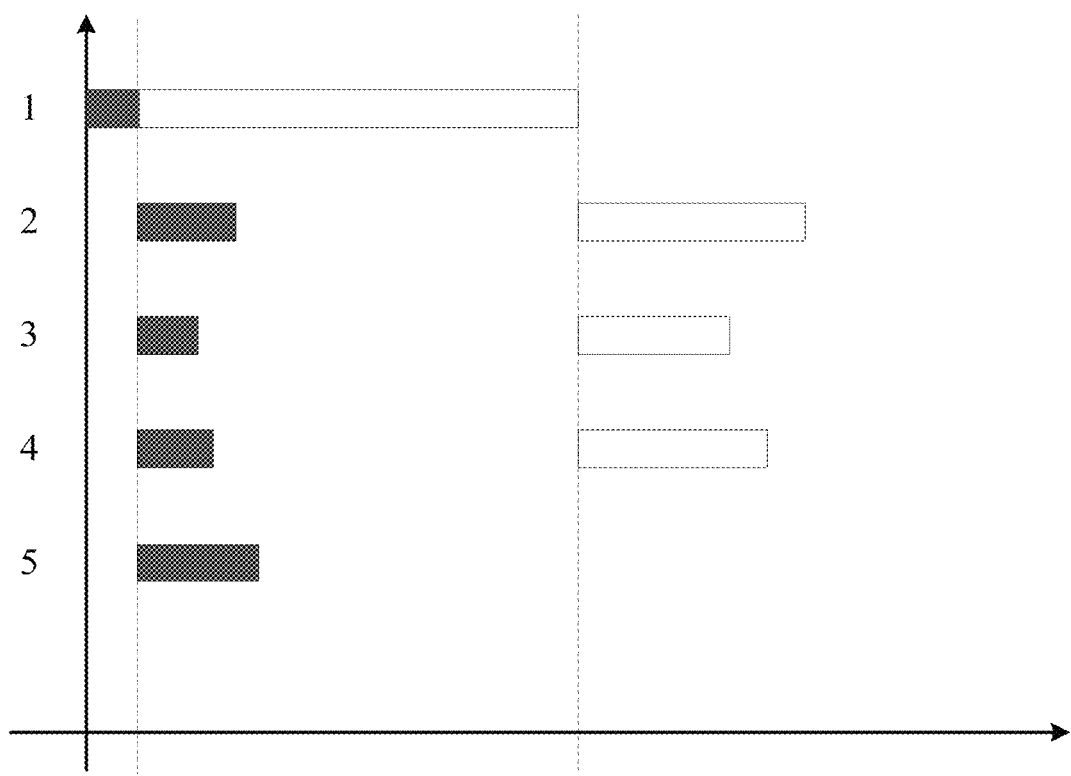

As shown in FIG. 7, after connection 1 is completed, and the network initialization operation is completed for all of connections 2, 3, 4, and 5, initiation of three new connections at the same time may be determined according to the concurrent connection number. Accordingly, connections 2, 3, and 4 may be selected from the four created, pre-allocated connections as the new connections to initiate requests for connections. Because the network initialization operation has been performed to connections 2, 3, and 4, the download requests may be directly sent to the server and the corresponding data may be acquired from the server to complete downloading file blocks 2, 3, and 4.

Figure 8:
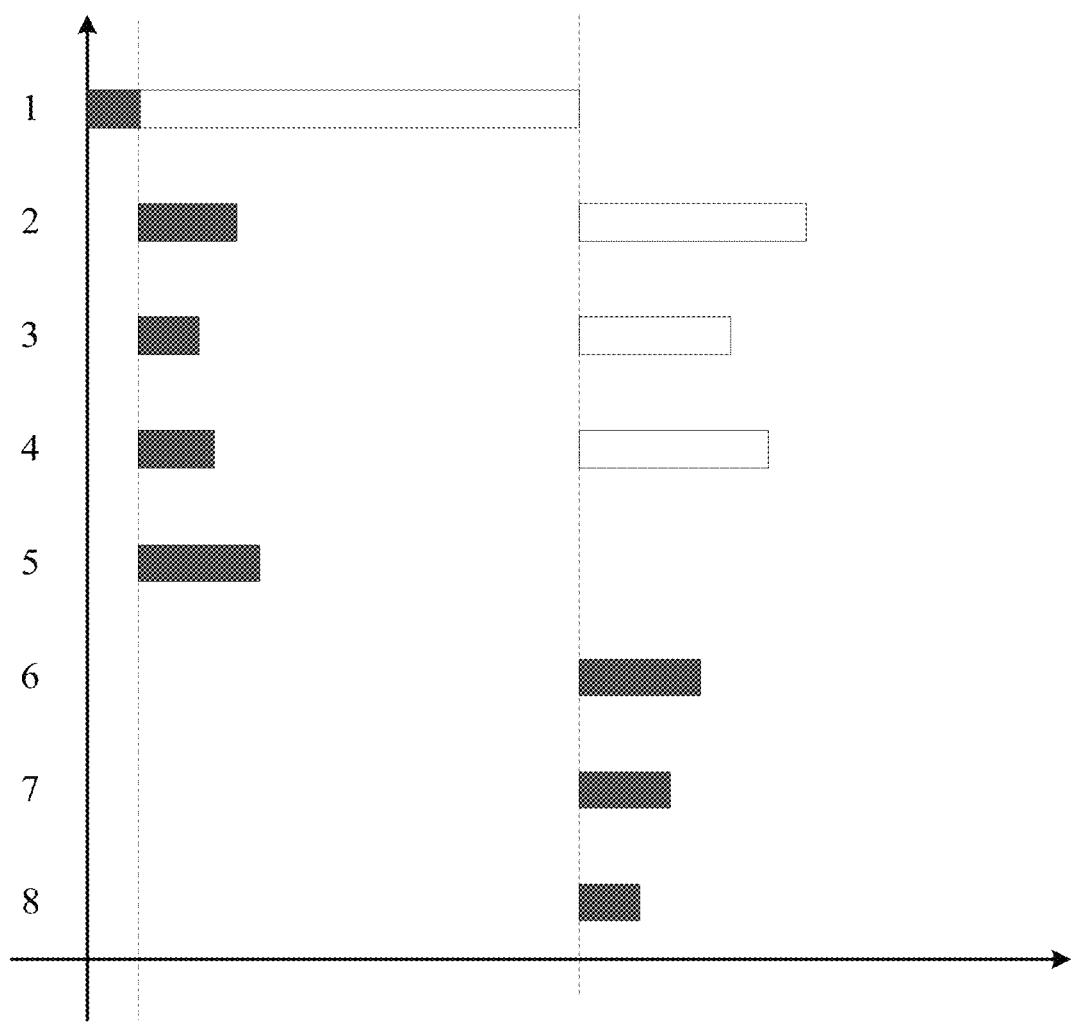

As shown in FIG. 8, as described above, connections 2, 3, and 4 have been used and downloading of the files is uncompleted, accordingly, another three pre-allocated connections, 6, 7, and 8, need to be re-created. Meanwhile, the corresponding network initialization operation may be performed to the newly created pre-allocated connections 6, 7, and 8.

Figure 9:
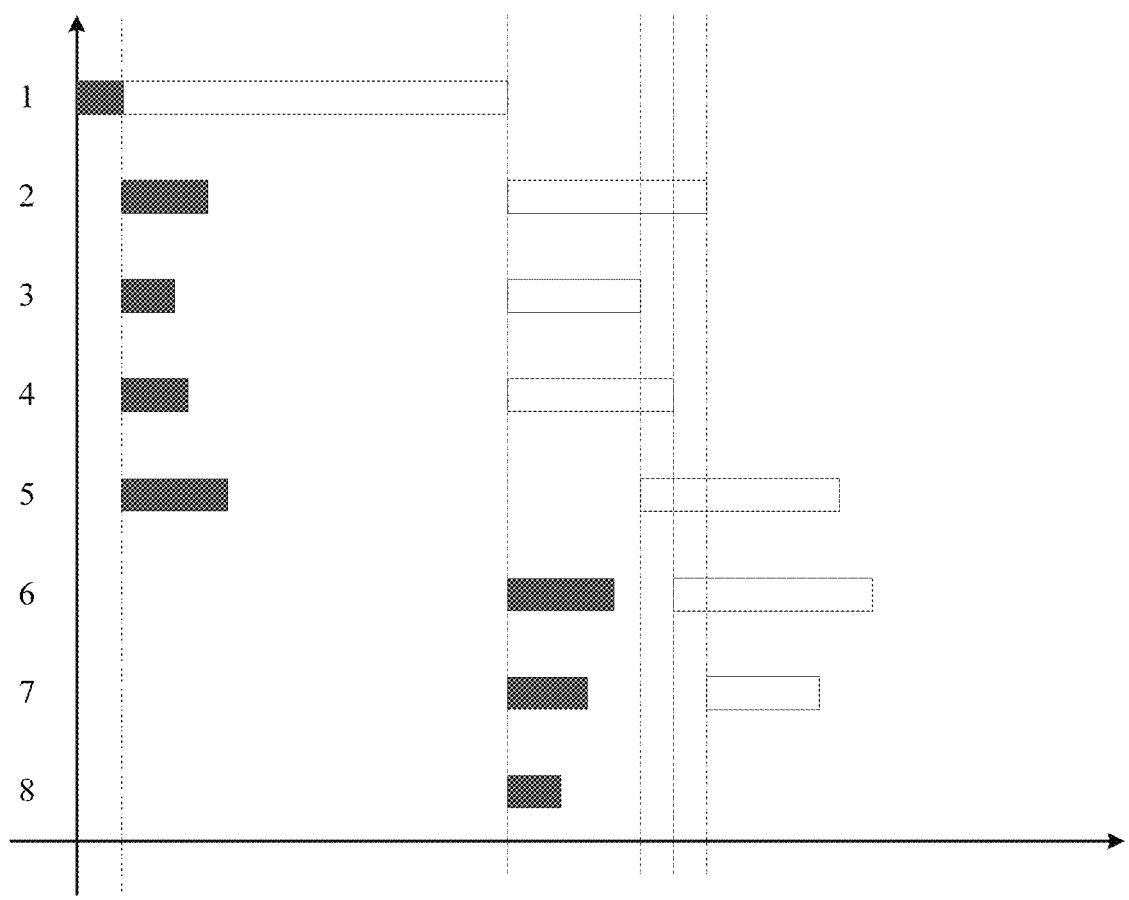

As shown in FIG. 9, after connections 2, 3, and 4 complete transmission, connections 5, 6, and 7 may be selected from the four remaining pre-allocated connections as new connections to initiate requests for connections. Likely, because the network initialization operation has been performed to connections 5, 6, and 7, the download requests may be directly sent to the server and the corresponding data may be acquired from the server to complete downloading file blocks 5, 6, and 7. After connections 5, 6, and 7 complete transmission, downloading of the seven file blocks is completed. At this point, the terminal device assembles the downloaded file blocks to obtain the file. In addition, connection 8 is not selected for use, and then the unused connection 8 is reclaimed.

Figure 10:
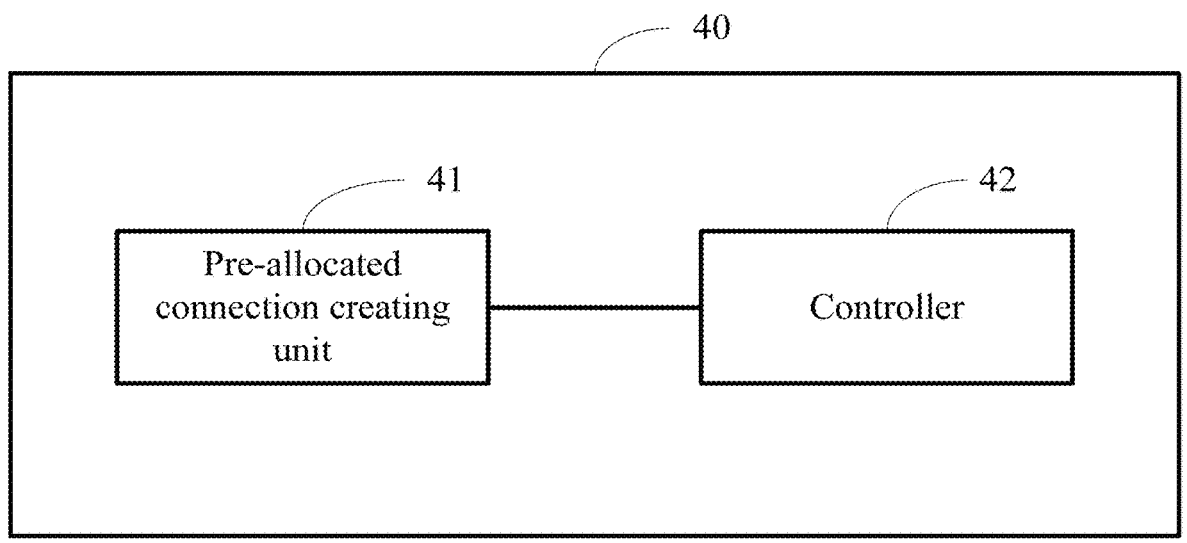
FIG. 10 illustrates a schematic structure diagram of an exemplary device for network connection download according to the present disclosure.

Referring to FIG. 10, FIG. 10 illustrates a schematic structure diagram of a first exemplary device for network connection download according to the present disclosure. The device 40 may include:

A pre-allocated connection creating unit 41, configured to create one backup pre-allocated connection.

A controller 42, configured to perform the network initialization operation to at least one backup pre-allocated connection created by the pre-allocated connection creating unit 41, to allow the device 40, while downloading a file, to select the needed pre-allocated connection directly from the at least one pre-allocated connection, without the need to re-perform the corresponding network initialization operation.

Figure 11:
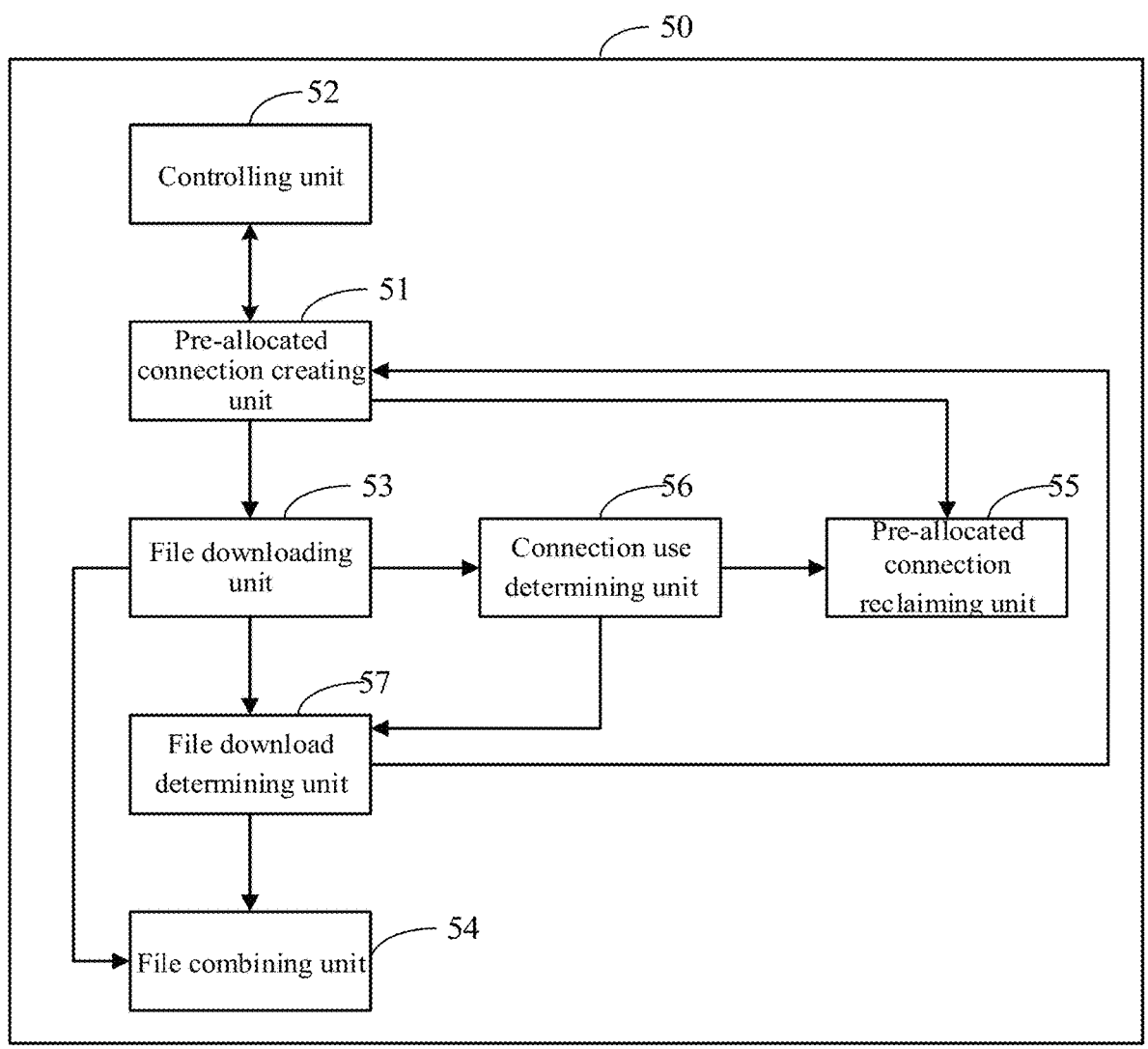
FIG. 11 illustrates a schematic structure diagram of a second exemplary device for network connection download according to the present disclosure.

Referring to FIG. 11, FIG. 11 illustrates a schematic structure diagram of a second exemplary device for network connection download according to the present disclosure. The device 50 may include:

A pre-allocated connection creating unit 51, configured to create the at least one backup pre-allocated connection.

In particular, the pre-allocated connection creating unit 51 may create the backup pre-allocated connection according to a quantity of concurrent connection of a file downloading task, where M=N+1, M denotes a quantity of the pre-allocated connection, N denotes the quantity of the concurrent connection, and both M and N are natural number.

A controller 52, configured to perform the network initialization operation to the at least one pre-allocated connection created by the pre-allocated connection creating unit 51, to allow the device, while downloading the file, to select the needed pre-allocated connection directly from at least one pre-allocated connection.

The network initialization operation may include performing DNS query for connection and connecting socket.

A file downloading unit 53, configured to select the pre-allocated connection having a quantity corresponding to the quantity of the concurrent connection of the file downloading task, from the at least one pre-allocated connection, created by the pre-allocated connection creating unit 51, to send a downloading request to the server through each of the selected pre-allocated connection and acquire the corresponding data from the server to complete downloading a file block. The server of the file may support the breakpoint continuing transmission download.

A file combining unit 54, configured to assemble at least a portion of the file block downloaded by the file downloading unit to obtain at least a partial content of the file.

A pre-allocated connection recycling unit 55, configured to recycle an unused pre-allocated connection from the at least one pre-allocated connection created by the pre-allocated connection creating unit 51.

Further, the device 50 may also include:

A connection use determining unit 56, configured to determine whether the quantity of the pre-allocated connection selected by the file downloading unit 53 equals to the quantity of the concurrent connection.

A file download determining unit 57, configured to determine whether downloading of the file is completed according to the file block downloaded by the file downloading unit 53, when the connection use determining unit 56 determines that the quantity of the pre-allocated connection selected by the file downloading unit 53 equals to the quantity of the concurrent connection. If "Yes", the file download determining unit 57 may send a first control signal to the file combining unit 54, and in response to the first control signal the file combining unit 54 may assemble at least parts of the file block downloaded by the file downloading unit 53 to obtain at least a partial content of the file. Otherwise, the file download determining unit 57 may send a second control signal to the pre-allocated connection creating unit 51, in response to the second signal the pre-allocated connection creating unit 51 may create the same quantity of the backup pre-allocated connection, according to the quantity of the pre-allocated connection used by the file downloading unit 53, and the controller 52 may perform the corresponding network initialization operation before the pre-allocated connection is used.

The method and device of the present disclosure for network connection download may create the pre-allocated connection according to connection allocation policy, and may complete the network initialization operation for the pre-allocated connection in advance. When use is actually needed, a connection may be fetched directly from the pre-allocated connection to send a file downloading request to a server and acquire corresponding data from the server, without the need to spend time and resources re-performing the network initialization operation, thereby shortening the time consumed in connection transmission and improving transmission efficiency.

Operations disclosed herein may be implemented by hardware, and may also be implemented by software, or their combination. The execution of instructions may be completed by hardware, such as one or more processors, and may also be completed by software, or their combinations.

The implementations of the technical solution may be described to clearly illustrate the technical solution in the disclosed embodiments. Based on the disclosed embodiments, one of ordinary skill in the art may derive other embodiments consistent with the present disclosure, all of which are included within the scope of the present disclosure. Thus, in one embodiment, a device or a terminal device may be provided, for implementing operations in the disclosed method for network connection download.

Figure 12:
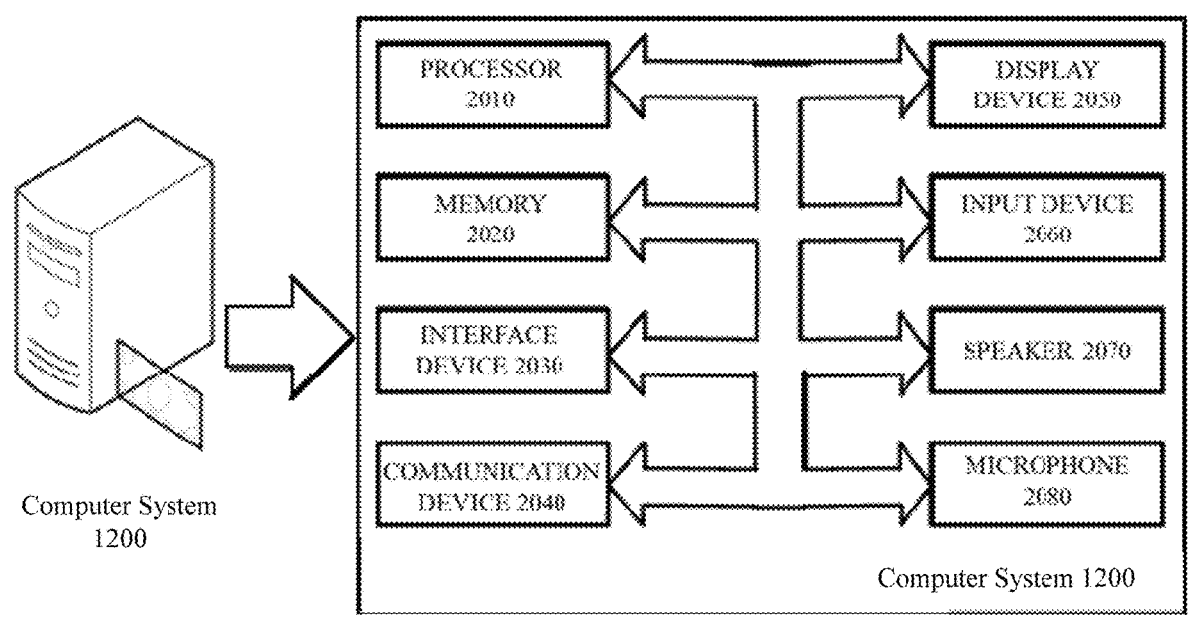
FIG. 12 illustrates a block diagram of an exemplary computer system consistent with disclosed embodiments.

FIG. 12 illustrates a block diagram of an exemplary computer system consistent with disclosed embodiments. The disclosed device, terminal device, server, and/or server terminal may include the computer system shown in FIG. 12. The exemplary computer system 1200 may include a processor 2010, a memory 2020, an interface device 2030, a communication device 2040, a display device 2050, an input device 2060, a speaker 2070, and a microphone 2080.

The processor 2010 may be a central processing unit (CPU), a microprocessor (MCU), etc. The memory 2020 may include a read only memory (ROM), a random access memory (RAM), and a nonvolatile memory such as a hard disk, etc. The interface device 2030 may include a universal serial bus (USB) port, a headphone jack, etc.

The communication device 2040 may be able to perform wired or wireless communications.

The display device 2050 may be a liquid crystal display panel, a touch screen display panel, etc. The input device 2060 may include a touch screen, a keyboard, etc. A user may input a voice message through the speaker 2070 and may output a voice message through the microphone 2080.

The devices shown in FIG. 12 are for illustrative purposes and are not intended to limit the disclosure, the applications or uses of present invention.

In one embodiment, the memory 2020 may be used to store instructions for controlling the processor 2010 to carry out operations, such that the disclosed methods may be executed. Those skilled in the art would understand that although a plurality of devices are shown in FIG. 12, the present disclosure may involve some or all of the devices. For example, the computer system 1200 in FIG. 12 may include the processor 2010 and the memory 2020 to implement the disclosed methods. Based on the present disclosure, those skilled in the art would be able to design instructions. The instructions may be stored on the memory and may be executed by one or more processors to implement the disclosed methods.

The present disclosure may include a method, device, and/or a computer program product. The computer program product may include a computer readable storage medium (or media), such as a non-transitory computer readable storage medium, having computer readable program instructions thereon for causing a processor to carry out aspects of the present disclosure.

The computer readable storage medium may be a tangible device that is able to retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. Those skilled in the art would understand that the implementations by hardware, software or the combination of hardware and software may be equivalent.

Embodiments of the present disclosure have been described, but not intending to impose any unduly constraint to the appended claims. Any modification of equivalent structure or equivalent process made according to the disclosure and drawings of the present disclosure, or any application thereof, directly or indirectly, to other related fields of technique, is considered encompassed in the scope of protection defined by the claims of the present disclosure.

What is claimed is:

1. A method for network connection download, comprising:
   creating, by a terminal device, a connection with a server to request a file downloading task for downloading a file;
   in response to a determination that the file downloading task supports a breakpoint continuing transmission according to message data returned from the server, creating, by the terminal device, pre-allocated connections with the server for backup, wherein a quantity of the pre-allocated connections is more than a quantity of maximum allowable concurrent connections of the file downloading task; and
   before a pre-allocated connection of the pre-allocated connections is used, performing a network initialization operation to the pre-allocated connections correspondingly to allow the terminal device, while downloading the file, to select, from the pre-allocated connections, the pre-allocated connection needed for downloading the file after the network initialization operation.

2. The method for network connection download according to claim 1, wherein creating, by the terminal device, the pre-allocated connections includes:
   according to the quantity of the maximum allowable concurrent connections of the file downloading task, creating the pre-allocated connections based on M=N+1, wherein M denotes the quantity of the pre-allocated connections, N denotes the quantity of the maximum allowable concurrent connections, and both M and N are natural numbers.

3. The method for network connection download according to claim 1, wherein the needed pre-allocated connection is selected from the pre-allocated connections by:
   selecting, by the terminal device, from the pre-allocated connections, at least one pre-allocated connection, having a quantity corresponding to a quantity of concurrent connections of the file downloading task to send a download request to the server through each of the selected at least one pre-allocated connection and acquire corresponding data to complete downloading a file block,
   wherein the file supports breakpoint continuing transmission download at the server.

4. The method for network connection download according to claim 3, after selecting, by the terminal device, from the pre-allocated connections, the at least one pre-allocated connection, having the quantity corresponding to the quantity of the concurrent connections of the file downloading task, further including:
   when a quantity of currently-used pre-allocated connections equals to the quantity of the concurrent connections and downloading of the file is uncompleted, creating, by the terminal device, backup pre-allocated connections having a same quantity according to the quantity of the currently-used pre-allocated connections, and re-performing the corresponding network initialization operation before the pre-allocated connection is used.

5. The method for network connection download according to claim 3, further including:
   assembling, by the terminal device, at least a portion of the downloaded file block to obtain at least a partial content of the file; and
   recycling, by the terminal device, an unused pre-allocated connection from the pre-allocated connections.

6. The method for network connection download according to claim 3, further comprising:
   in response to determining that a quantity of currently-used pre-allocated connections equals to the quantity of the concurrent connections and a progress of the file block downloaded by the currently-used pre-allocated connections exceeds a predetermined percentage, creating, by the terminal device, backup pre-allocated connections having a same quantity according to the quantity of the currently-used pre-allocated connections.

7. A terminal device, comprising:
   a memory and at least one processor coupled to the memory, wherein:
   the memory stores computer-executable instructions for controlling the at least one processor to:
     create a connection with a server to request a file downloading task for downloading a file;
     in response to a determination that the file downloading task supports a breakpoint continuing transmission according to message data returned from the server, create pre-allocated connections with the server for backup, wherein a quantity of the pre-allocated connections is more than a quantity of maximum allowable concurrent connections of the file downloading task; and
     before a pre-allocated connection of the pre-allocated connections is used, perform a network initialization operation to the pre-allocated connections correspondingly to allow the terminal device, while downloading the file, to select, from the pre-allocated connections, the pre-allocated connection needed for downloading the file after the network initialization operation.

8. The terminal device according to claim 7, wherein the at least one processor is configured to:
   according to the quantity of the maximum allowable concurrent connections of the file downloading task, create the pre-allocated connections based on M=N+1, wherein M denotes the quantity of the pre-allocated connections, N denotes the quantity of the maximum allowable concurrent connections, and both M and N are natural numbers.

9. The terminal device according to claim 7, wherein the at least one processor is configured to:
   select from the pre-allocated connections at least one pre-allocated connection, having a quantity corresponding to a quantity of concurrent connections of the file downloading task, send a download request to the server through each of the selected at least one pre-allocated connection and acquire corresponding data to complete downloading a file block,
   wherein the file supports breakpoint continuing transmission download at the server.

10. The terminal device according to claim 9, wherein the at least one processor is configured to:
    when a quantity of currently-used pre-allocated connections equals to the quantity of the concurrent connections and downloading of the file is uncompleted, create backup pre-allocated connections having a same quantity according to the quantity of the currently-used pre-allocated connections, and re-perform the corresponding network initialization operation before the pre-allocated connection is used.

11. The terminal device according to claim 9, wherein the at least one processor is configured to:
   assemble at least a portion of the downloaded file block to obtain at least a partial content of the file; and
   recycle an unused pre-allocated connection from the pre-allocated connections.

12. The terminal device according to claim 9, wherein the at least one processor is configured to:
   in response to determining that a quantity of currently-used pre-allocated connections equals to the quantity of the concurrent connections and a progress of the file block downloaded by the currently-used pre-allocated connections exceeds a predetermined percentage, create backup pre-allocated connections having a same quantity according to the quantity of the currently-used pre-allocated connections.

13. A non-transitory computer-readable storage medium having computer-executable instructions stored thereon for, when executed by a processor of a terminal device, performing a method for network connection download, the method comprising:
   creating a connection with a server to request a file downloading task for downloading a file;
   in response to a determination that the file downloading task supports a breakpoint continuing transmission according to message data returned from the server, creating pre-allocated connections with the server for backup, wherein a quantity of the pre-allocated connections is more than a quantity of maximum allowable concurrent connections of the file downloading task; and
   before a pre-allocated connection of the pre-allocated connections is used, performing a network initialization operation to the pre-allocated connections correspondingly to allow the terminal device, while downloading the file, to select, from the pre-allocated connections, the pre-allocated connection needed for downloading the file directly after the network initialization operation.

14. The non-transitory computer-readable storage medium according to claim 13, wherein creating the pre-allocated connections includes:
   according to the quantity of the maximum allowable concurrent connections of the file downloading task, creating the pre-allocated connections based on M=N+1, wherein M denotes the quantity of the pre-allocated connections, N denotes the quantity of the maximum allowable concurrent connections, and both M and N are natural numbers.

15. The non-transitory computer-readable storage medium according to claim 13, wherein the needed pre-allocated connection is selected from the pre-allocated connections by:
   selecting from the pre-allocated connections, at least one pre-allocated connection having a quantity corresponding to a quantity of concurrent connection of the file downloading task to send a download request to the server through each of the selected at least one pre-allocated connection and acquire corresponding data to complete downloading a file block,
   wherein the file supports breakpoint continuing transmission download at the server.

16. The non-transitory computer-readable storage medium according to claim 15, wherein after selecting from the pre-allocated connections, the pre-allocated connection having the quantity corresponding to the quantity of the concurrent connections of the file downloading task, the method further includes:
   when a quantity of currently-used pre-allocated connections equals to the quantity of the concurrent connections and downloading of the file is uncompleted, creating, by the terminal device, backup pre-allocated connections having a same quantity according to the quantity of the currently-used pre-allocated connections, and re-performing the corresponding network initialization operation before the pre-allocated connection is used.

17. The non-transitory computer-readable storage medium according to claim 15, wherein after the pre-allocated connection needed for downloading the file is selected directly from the pre-allocated connections, the method further includes:
   assembling at least a portion of the downloaded file block to obtain at least a partial content of the file; and
   recycling an unused pre-allocated connection from the pre-allocated connections.

18. The non-transitory computer-readable storage medium according to claim 15, wherein, after selecting, from the pre-allocated connections, the pre-allocated connection having the quantity corresponding to the quantity of the concurrent connections of the file downloading task, the method further includes:
   in response to determining that a quantity of currently-used pre-allocated connections equals to the quantity of the concurrent connections and a progress of the file block downloaded by the currently-used pre-allocated connections exceeds a predetermined percentage, creating, by the terminal device, backup pre-allocated connections having a same quantity according to the quantity of the currently-used pre-allocated connections.

* * * * *